Figure 1:
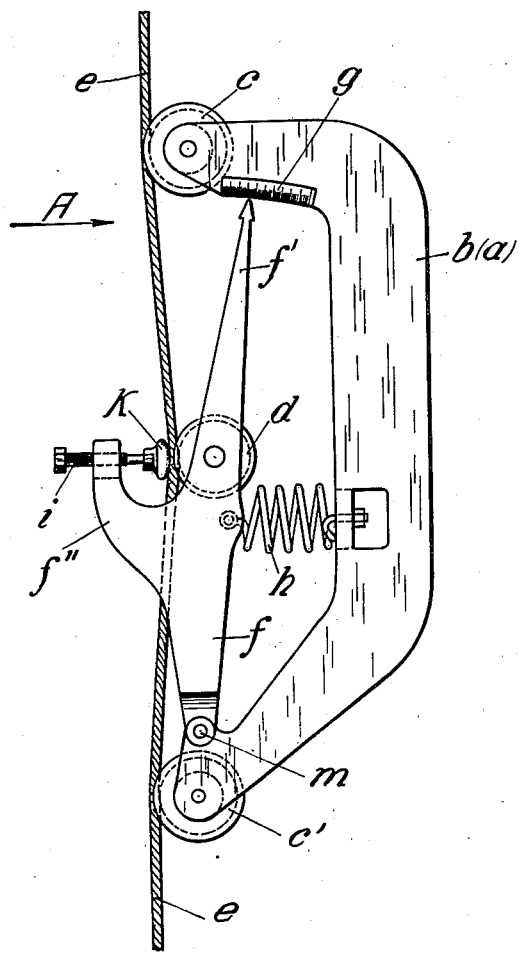

Dec. 11, 1928.　　W. KLEMPERER　　1,694,509

TENSIOMETER

Filed Nov. 12, 1925

Inventor:
Wolfgang Klemperer
by Cruse Maun
his Attorneys.

Patented Dec. 11, 1928.

1,694,509

UNITED STATES PATENT OFFICE.

WOLFGANG KLEMPERER, OF AKRON, OHIO, ASSIGNOR TO LUFTSCHIFFBAU ZEPPELIN GESELLSCHAFT MIT BESCHRAENKTER HAFTUNG, OF FRIEDRICHSHAFEN, BODENSEE, GERMANY.

TENSIOMETER.

Application filed November 12, 1925, Serial No. 68,491, and in Germany December 1, 1924.

My invention relates to devices for determining the tension force in wires, ropes and the like by means of deflecting such tension members over a pre-determined length. The known instruments for this purpose are very imperfect. Generally they do not allow for different thicknesses of the tension member and also it is difficult to get them in the proper operating position.

According to my invention these drawbacks are avoided by providing three guide members necessary for determining the deflection under certain spring pressure in cross direction all on one side of such tension member. Thus it is possible to measure the camber directly without considering the thickness of the tension member, which allows for a constant scale.

For this purpose I provide a fourth member serving as a middle support for the wire or rope and consisting of a bolt, screw or the like, situated opposite the middle guide member. By means of this screw the tension member is pressed against the middle guide member and is thereby deflected from its original straight line position drawn between the two outer guide members forming the other supports. While the instrument is being attached to and removed from the tension member the screw is in a screwed back position so as to provide sufficient space between the screw and guide member to allow for an easy application and removal.

Having given a general description of my invention, I now want to point it out more in detail referring to the drawings giving an example embodying my invention.

Figure 2:
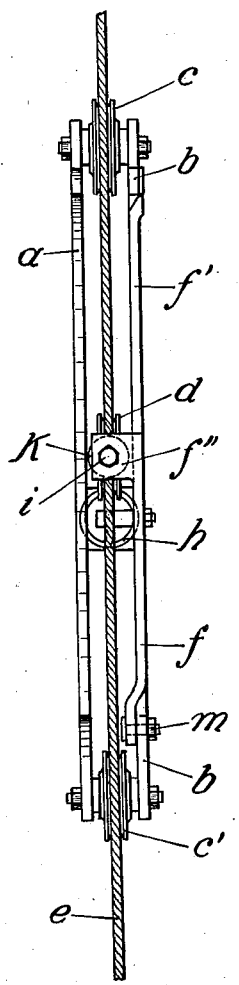

Fig. 1 is an elevation of a tensiometer of the type described and Fig. 2 is a front view on the same seen in the direction of arrow A in Fig. 1.

Two pieces of sheet metal $a$ and $b$ are shaped and connected together so as to form a kind of stirrup at the ends of which the supporting rollers $c$ and $c'$ are situated. Rope $e$ bears against these rollers. A third roller $d$ is provided between the other two rollers and on the same side with them in relation to the rope $e$. Roller $d$ is fixed on a lever $f$ which is pivoted at $m$ in the metal plate $b$. The other end of $f$ is developed into an indicating hand $f'$ sliding over scale $g$ on the other end of plate $b$. At the middle portion of $f$ an arm $f''$ branches off in which a screw $i$ is provided for the purpose of pressing a dolly $k$ against the rope $e$ and the rope against roller $d$. A spring $h$ having one end fastened to the stirrup like structure $a\ b$, and having its other end fastened to lever $f$, exerts a certain deflecting effect on lever $f$ and indirectly on rope $e$, the result being measured by means of hand $f'$ sliding over scale $g$. In applying the instrument to a rope or tension member, the screw $i$ is to be screwed tightly; i. e., until the rope is tightly pressed against the opposite guide $d$. Only then may readings be taken. The scale is graduated in terms of tensional force units, which for example may be pounds or kilograms. These may readily be calculated trigonometrically from the spring characteristics, or they may be attained by calibration setting of a tension member inserted in my device under known tension stresses. The zero position of hand $f'$ is determined by properly adjusting the rear end of spring $h$.

I do not want to limit myself to the details of the example described or shown in the drawings as many variations will occur to those skilled in the art.

What I claim is:

1. A tensiometer comprising three operatively connected guides disposed in staggered relation, two of the guides serving as supports for a tension member situated at the same side of all three of the guides, the other guide being disposed intermediately of the supporting guides, means connected to the intermediate guide for pressing the tension member against the latter guide, resilient means connected to the intermediate guide for resisting movement of the latter with respect to the supporting guides.

2. A tensiometer comprising three operatively connected guides disposed in staggered relation, two of the guides serving as supports for a tension member situated at the same side of all three of the guides, the other guide being provided with an indicating hand and disposed intermediately of the supporting guides, adjustable means connected to the intermediate guide for pressing the tension member against the latter guide, resilient means connected to the intermediate guide for resisting movement of the latter with respect to the supporting guides and a scale adjacent said hand.

3. A tensiometer comprising two guides serving as supports for a tension member, a rigid member connecting the two guides, a third guide arranged intermediately of, and positioned on the same side of the tension member as, the first two guides, means connected to the third guide for pressing the tension member thereagainst, and means tending to deflect the third guide away from a straight line joining the other two guides.

4. A tensiometer comprising two guides, serving as supports for a tension member, a rigid member connecting the two guides, a third guide arranged intermediately of, and positioned on the same side of the tension member as, the first two guides, means connected to the third guide for pressing the tension member thereagainst, yieldable means constantly tending to deflect the third guide away from a straight line joining the other two guides, and an indicating hand constituting a part of, and for indicating the degree of deflection of, the third guide.

5. A tensiometer comprising two rollers serving as supports for a tension member, means supporting the rollers a fixed distance apart, a lever provided with a third roller disposed intermediately of the first two rollers, resilient means connected to the third roller for resisting movement thereof with respect to the first two rollers, means for pressing the tension member against the third roller, and means for indicating the deflection of the third roller from the straight line drawn between the first two rollers.

6. A tensiometer comprising two rollers serving as supports for a tension member, a stirrup-like rigid structure supporting the rollers at its respective ends, a lever pivoted adjacent one end of the rigid structure and extending over its gap, a third roller mounted intermediately of the lever and disposed on the same side of the tension member as the first two rollers, said lever having an offset portion provided with a screw for confining the tension member against the third roller, a tension spring connecting intermediate portions of the lever and the rigid structure for deflecting the tension member from the straight line drawn between the first two rollers, an indicating pointer at the free end of said lever and a cooperating scale on said structure both together indicating the degree of deflection of the tension member.

WOLFGANG KLEMPERER.